April 15, 1930.  G. ANDERSEN  1,754,975
NONRETURN VALVE
Filed Dec. 29, 1927
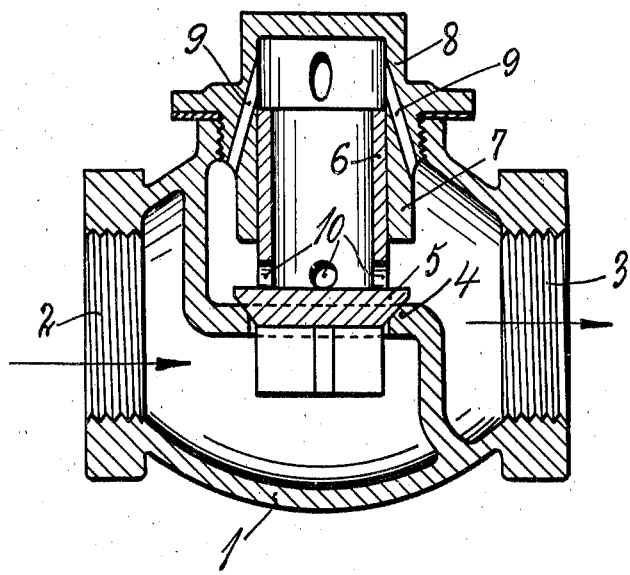
INVENTOR
GEORG ANDERSEN
BY
*[signature]*
ATTORNEY Patented Apr. 15, 1930

1,754,975

UNITED STATES PATENT OFFICE

GEORG ANDERSEN, OF OSLO, NORWAY

NONRETURN VALVE

Application filed December 29, 1927, Serial No. 243,391, and in Norway March 1, 1927.

This invention relates to non-return valves and has for its object to provide a valve working exactly and with very little noise and having a long life.

The drawing shows a vertical section of my invention.

1 is the valve casing with inlet 2 and outlet 3, between which the valve seat 4 is arranged. 5 is the valve disc proper. The valve disc 5 lifts automatically as soon as there exists a certain difference in pressure between the inlet and the outlet, and it is carried back upon its seat by gravity, when the difference in pressure has been equalized.

The upper side of the valve disc is provided with an upwardly open tubular part 6 fitting as a piston in a downwardly open cylinder 7 mounted in the top cover 8 of the valve casing.

As it will be seen the telescopic working parts 6 and 7 comprise a liquid-brake, including between each other a certain quantity of liquid, which must be forced out during the lifting stroke of the valve disc.

The flow of liquid out from the cylinder 7 takes place at first through inclined channels 9 leading from the upper part of the cylinder 7 and later on through openings 10 arranged in the wall of the tube 6 immediately above the valve disc 5.

At the beginning of the upward stroke of the valve disc the openings 9 and 10 are quite free and the liquid will therefore not materially impede the lifting movement of the valve disc. But during this movement the area of the passages for the liquid in the channels 9 as well as in the openings 10 is gradually reduced, because the upper edge of the cylinder 6 and the lower edge of the cylinder 7 operate as slide-valves in cooperation with the said channels and openings.

When the valve has nearly reached its upper position, the compartment between the cylinders 6 and 7 will be almost completely closed and the remaining liquid will then act as a cushion preventing the valve disc from striking the top cover and thereby also preventing any noise.

What I claim is:

1. In a non-return valve the combination of a valve casing containing inlet and outlet, a valve disc controlling the communication between inlet and outlet, an upwardly open hollow piston on the upper side of the disc, apertures near the piston bottom connecting the interior of said piston with the outlet, a stationary downwardly open cylinder for said piston and separate apertures near the upper end of the cylinder connecting its interior top space with the outlet.

2. In a non-return valve the combination of a valve casing containing inlet and outlet, a valve disc controlling the communication between inlet and outlet, an upwardly open hollow piston on the upper side of the disc, apertures near the piston bottom connecting the interior of said piston with the outlet, a stationary downwardly open cylinder for said piston, separate apertures near the upper end of the cylinder connecting its interior top space with the outlet, the free area of said apertures in cylinder and piston being adapted to be controlled by the upper piston edge and the lower cylinder edge respectively simultaneously so as to be reduced during the lifting stroke of the valve disc.

In testimony whereof I have signed my name to this specification.

GEORG ANDERSEN.